United States Patent [19]

Nozawa et al.

[11] Patent Number: 4,501,998
[45] Date of Patent: Feb. 26, 1985

[54] NUMERICAL CONTROLLER EQUIPPED WITH OPTIONAL BLOCK SKIP FUNCTION

[75] Inventors: Ryoichiro Nozawa, Shibuya; Tsuyoshi Nagamine, Hachioji; Hideaki Kawamura, Hachioji; Mitsuto Miyata, Hachioji, all of Japan

[73] Assignee: Fujitsu Fanuc Limited, Minamitsuru, Japan

[21] Appl. No.: 395,077

[22] PCT Filed: Oct. 13, 1981

[86] PCT No.: PCT/JP81/00279
§ 371 Date: Jun. 11, 1982
§ 102(e) Date: Jun. 11, 1982

[87] PCT Pub. No.: WO82/01425
PCT Pub. Date: Apr. 29, 1982

[30] Foreign Application Priority Data

Oct. 13, 1980 [JP] Japan .............................. 55-142569

[51] Int. Cl.³ ............................................. G05B 19/42
[52] U.S. Cl. ..................................... 318/568; 318/632; 364/141
[58] Field of Search ................. 318/568, 632; 364/141

[56] References Cited

U.S. PATENT DOCUMENTS

| 3,934,186 | 1/1976 | Hayakawa | 318/568 X |
| 4,011,437 | 3/1977 | Hohn | 318/568 X |
| 4,025,838 | 5/1977 | Watanabe | 318/568 |
| 4,140,953 | 2/1979 | Dunne | 318/632 X |
| 4,314,329 | 2/1982 | Crewe et al. | 364/141 |
| 4,348,623 | 9/1982 | Kobayashi et al. | 318/568 |

Primary Examiner—B. Dobeck
Attorney, Agent, or Firm—Staas & Halsey

[57] ABSTRACT

A numerical controller having an extended optional block skip function which permits selection of an optional block in a certain specific section of an execution program. In a numerical information storage medium is stored a cutting program in which a specific block is provided with skip object indicating information and skip select information, which is data for deciding whether to skip over the block and which can assume at least two values. Information indicating which ones of the blocks specified as the objects of optional block skip control are to be validated and invalidated is entered from a block select switch. A block skip circuit checks whether or not the skip object indicating information is present at the head or intermediate portion of each block. If not, the block is selected and, if the information is present, the skip select information is collated with information from the block select switch. As a result of this collation, when the block is to be invalidated, the block is skipped over and when the block is to be validated, the block is executed. A variety of cutting operations can be achieved using one cutting program, markedly improving the maneuverability and function of the numerical controller.

5 Claims, 7 Drawing Figures

NUMERICAL CONTROLLER EQUIPPED WITH OPTIONAL BLOCK SKIP FUNCTION

BACKGROUND AND SUMMARY OF THE INVENTION

The present invention relates to improvements in a numerical controller equipped with an optional block skip function.

Conventional apparatuses of this kind are arranged so that if a special character, such as a slash (the symbol "/"), is present in a cutting program block at the head thereof, when an optional block skip switch on an operator panel is ON, information concerning the block is skipped and regarded as invalid. The information concerning the block is regarded as valid and delivered out to a buffer storage circuit for execution only when the switch is OFF. That is, the prior art apparatuses only permit the option of whether to execute a predetermined block in a specified section in a series of programs.

Accordingly, one has the option of cutting a plate as shown in FIG. 1 and boring at positions 10 and 11 in a certain lot and, in the next lot, boring only at the position 10 after cutting. However, one does not have the option of boring at a position 12 instead of 11 after the cutting in the next lot.

SUMMARY OF THE INVENTION

The present invention has for its object to enable the selection of a desired block in a certain specified section in an execution program, thereby to extend the optional block skip function. According to the present invention, a specified block includes skip object indicating information and skip select information, which serves as data for deciding whether to skip over the block and which can assume at least two values. The skip select information, which can take a binary value, can be used to select an optional block from a plurality of blocks.

DESCRIPTION OF THE PREFERRED EMBODIMENTS

Figure 1:
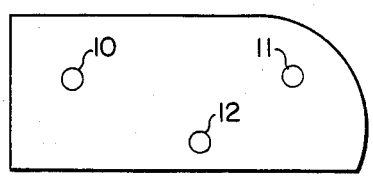
FIG. 1 is a cutting diagram used for explaining the operation of a prior art example.
Figure 3:
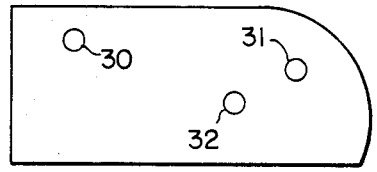
FIG. 3 is a cutting diagram explanatory of the operation of the equipment shown in FIG. 2.
Figure 2:
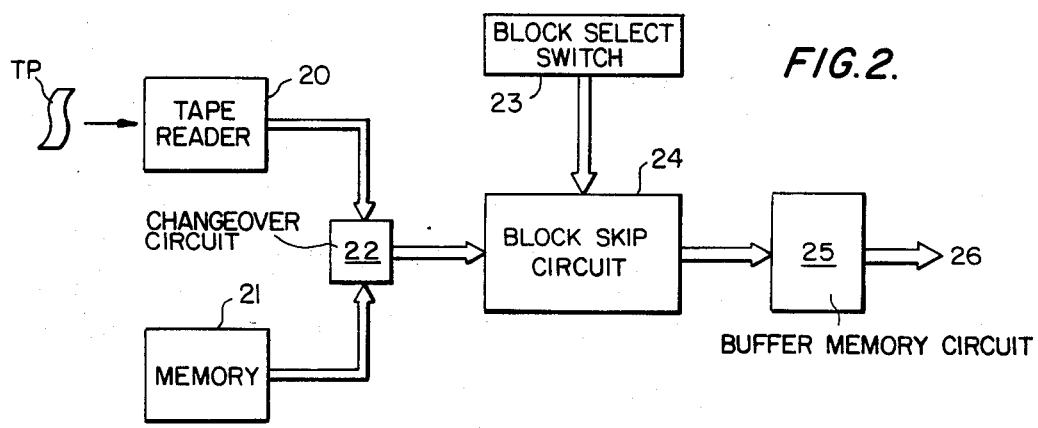
FIG. 2 is a block diagram illustrating the principal part of equipment embodying the present invention.

FIG. 2 is a block diagram illustrating the principal part of equipment embodying the present invention. Reference numeral 20 indicates a tape reader, 21 a memory, 22 a changeover circuit or switch, 23 is a block select switch, 24 a block skip circuit, 25 a buffer memory circuit, 26 a data processing unit, and TP a command stage. FIG. 3 is a cutting diagram explanatory of the operation of the equipment shown in FIG. 2, reference numerals 30 to 32 indicating the positions where holes are to be made.

In order to make a hole at one of the positions 30 to 32 (as specified by the operator) in FIG. 3, three blocks, such as those given below, are inserted in a section of boring steps in a cutting program:

/ 1 N 1 2 3 G 8 1 X 3 0 - - - ✻
/ 2 N 1 2 3 G 8 1 X 3 1 - - - ✻
/ 3 N 1 2 3 G 8 1 X 3 2 - - - ✻

Here, the slash (/) added to the head or beginning of each block is skip object indicating information specifying that the block is the object of optional block skip control, and the characters "1", "2" and "3" immediately following the slash are skip select information for deciding whether to skip the block. Incidentally, "N 1 2 3" is a sequence number; "G 8 1 X 3 0 . . .", G 8 1 X 3 1 . . .", "G 8 1 X 3 2 . . ." are data words instructing boring operations at the positions 30 to 32; and " " is a character indicating the end of the block.

The program, having inserted therein such three blocks as mentioned above, is stored in the form of a command tape TP by punching a numerical information storage medium, such as a paper tape, or the program is stored as numerical information directly in the memory 21.

On the operator panel is further provided the block select switch 23 for entering information as to which ones of the blocks stored as the objects of the optional block skip control in the numerical information storage medium are to be made valid and invalid during actual cutting. The block select switch 23 is, in concrete terms, comprised of three switches 40, 41 and 42 corrsponding to the skip select information 1, 2 and 3, for instance, as shown in a plan view in FIG. 4. From a switch in the OFF state, information to the effect that the block corresponding to the switch is valid is sent to the block skip circuit 24 and, from a switch in the ON state, information to the effect that the block corresponding to the switch is invalid is sent to the block skip circuit 24. In the illustrated example, since only the switch 40 is OFF, information to the effect that only the block related to "/ 1" is valid is sent out. The block select switches shown in FIG. 4 can also be replaced with a single switch as, for example, shown in FIG. 5, which is marked with three graduations 1, 2 and 3. In this case, the switch is designed so that when the operator selects a switch position i (i = 1, 2, 3), a block related to "/ i" in the program may be selected.

The cutting program stored in the command tape TP or memory 21 is provided via the changeover circuit 22 to the block skip circuit 24. The block skip circuit 24 checks whether the skip object indicating information "/" is present at the head of each block in the cutting program and, if such information is not added, the block is sent to the buffer circuit 25 because it is an ordinary block which is not the object of the optional block skip control.

If the skip object indicating information "/" is present, the skip select information immediately following the skip object indicating information "/" is collated or compared with information from the block select switch 23 and, if it turns out as a result of the collation that the block is one to be made invalid, the block is skipped over. That is to say, the block is not sent to the buffer memory circuit 25 and is invalidated. As a result of the collation, if the block is one that is to be validated, the block is sent to the buffer memory circuit 25, as is the case with the ordinary block. In the example illustrated in FIG. 4, only the block "/ 1 N 1 2 3 G 8 1 X 3 0 - - - ✻" is sent to the buffer memory circuit 25, from which it is provided to the data processing unit 26, making a hole at the position 30.

Figure 4:
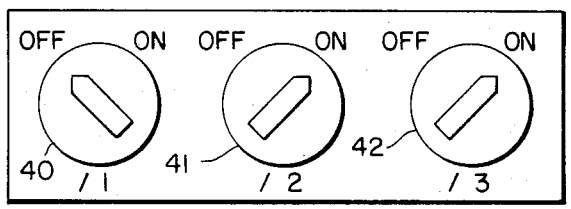
FIGS. 4, 5 and 7 are plan views showing block select switches.
Figure 5:
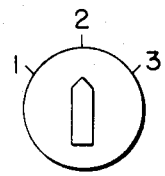

In FIG. 4, if only the switch 41 where held in the OFF state, only the block "/ 2 N 1 2 3 G 8 1 X 3 1 - - - ✘" would be executed and, if only the switch 42 were OFF, only the block "/ 3 N 1 2 3 G 8 1 X 3 2 - - -✘" would be executed.

Figure 6:
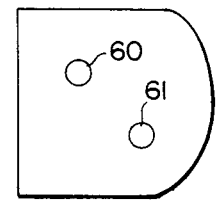
FIG. 6 is a cutting diagram explanatory of another embodiment of the present invention.

FIG. 6 is a cutting diagram explanatory of the operation of another embodiment of the present invention, illustrating an embodiment suitable for use in the case where it is desired to make a hole at only one of the positions 60 and 61.

In this embodiment, numeric codes which are equal in absolute value but opposite in polarity, for instance, +1 and −1, are used as the skip select information, and two blocks such as those given below are inserted in a predetermined section of the program:

/ 1 N 1 2 3 G 8 1 X 6 0 - - -✘
/ −1 N 1 2 3 G 8 1 X 6 1 - - -✘

Figure 7:
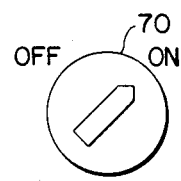

As the block select switch 23, only one switch 70 is provided, as shown in FIG. 7. When this switch is ON, information to the effect that the block related to "/ −1" is validated and the block related to "/ 1" is invalidated is sent to the block skip circuit 24, an when the switch is OFF, the reverse information is sent to the block skip circuit 24. With such an arrangement, in the illustrated example, since the switch 70 is ON, the block "/ −1 N 1 2 3 G 8 1 X 6 1 - - -✘" is executed, carrying out boring at the position 61.

Further, the above-described two embodiments can be combined as another embodiment. That is to say, four blocks such as those given below are inserted in the program, using as the skip select information a plurality of numeric codes which can assume both positive and negative values, such as, for instance, +1, −1, +2 and −2:

/ 1 / 2 N 1 2 3 G 8 1 X 0 1 - - -✘
/ −1 / 2 N 1 2 3 G 8 1 X 0 2 - - -✘
/ 1 / −2 N 1 2 3 G 8 1 X 0 3 - - -✘
/ −1 / −2 N 1 2 3 G 8 1 X 0 4 - - -✘ In the block select switch of FIG. 4, for example, the switch 40 is made to correspond to the block related to "/ ±1" and the switch 41 is made to correspond to the blocks related to "/ ±2". If it is predetermined that if there exists even one condition invalidating a block, then the block is invalid, the block of "/ 1 −2 N 1 2 3 G 8 1 X 0 3 - - -✘" would be selected in the illustrated example because the switch 40 is OFF and the switch 41 ON. In general, in the case of including k / ±n, such as / ±n₁, / =n₂, - - - / ±n_k, it is possible to select one of $2^k$ blocks at maximum.

While in the foregoing, the present invention has been described as being applied to boring, this is only for convenience of description and it is a matter of course that the present invention is applicable to other operations. The gist of the present invention resides in that the skip object indicating information specifying that a block is the object of optional block skip control, and the skip select information which serves as data for deciding whether to skip over the block and which can take at least two values, are added to the head or intermediate option of the block and in that a desired block is selected from a plurality of blocks. Accordingly, various modifications and variations may be effected within the scope of attaining such an object.

As will be appreciated from the foregoing description, according to the present invention, a specified block is provided with the skip object indicating information and the skip select information, which serves as data for deciding whether to skip over the block and which can assume at least two values. By identifying the skip select information, which can take a binary value, a desired block can be selected from a plurality of blocks. Accordingly, it is possible to select a desired block in a specific section of an execution program in such a manner as to execute a step A on one occasion and a step B on another occasion using one cutting program. Thus, the invention has the advantage that the maneuverability and function of the numerical controller can markedly be improved.

We claim:

1. A numerical controller having an optional block skip function, comprising:

numerical information storage medium means for storing a cutting program having inserted in a predetermined section thereof a plurality of machining blocks, each block including at its head or intermediate portion skip object indicating information for specifying that the block is the object of optional block skip control and skip select information which is data for deciding whether to skip the block and which can assume at least two values;

block select switch means for entering skip indicating information indicating which ones of the blocks stored as the objects of the optional block skip control in the numerical information storage medium means are to be skipped during actual machining; and block skip circuit means for determining whether the skip object indicating information is present at the head or intermediate portion of each block read out from the numerical information storage medium means, and, if not present, for executing the block and if present, comparing the skip select information with the skip indicating information from the block select switch means and skipping or executing the block depending on whether the block is to be skipped.

2. A numerical controller for executing a cutting program to machine a workpiece, said cutting program including a plurality of program blocks specifying predetermined machining operations, comprising:

numerical information storage medium means for storing said cutting program, including at least one program block having skip object indicating information and skip select information therein;

manually poperable block select switch means for identifying which blocks that include skip object identifying information are to be executed;

buffer memory circuit means for storing program blocks; and block skip circuit means responsive to said block select switch means for receiving program blocks from said numerical information storage medium means and sending them on for storage in said buffer memory circuit means if they do not include skip object indicating information and if they do include skip object indicating information along with skip select information corresponding to blocks identified by said block select switch means.

3. The numerical controller of claim 2, wherein said block select switch means comprises at least one ON/OFF switch.

4. The numerical controller of claim 2, wherein said block select switch means comprises a selection switch having a plurality of selectable positions, each selectable position corresponding to a program block having skip object indicating information and skip select information therein.

5. A numerical controller method for executing a machining program to machine a workpiece, said machining program including a plurality of program blocks specifying predetermined machining operations, comprising the steps of:

including skip object indicating information and skip select information in a plurality of program blocks;

storing said program blocks in a numerical information storage medium;

reading said program blocks out of said numerical information storage medium;

testing the read-out blocks to see if they include skip object indicating information;

storing the read-out blocks in a buffer memory circuit for subsequent execution if they do not include skip object indicating information;

storing the read-out blocks in the buffer memory, in the event that they do include skip object indicating information, only if they also include skip select information corresponding to blocks previously selected for execution on a manually operable block select switch.

* * * * *

UNITED STATES PATENT AND TRADEMARK OFFICE
CERTIFICATE OF CORRECTION

PATENT NO. : 4,501,998
DATED : February 26, 1985
INVENTOR(S) : RYOICHIRO NOZAWA ET AL.

It is certified that error appears in the above-identified patent and that said Letters Patent is hereby corrected as shown below:

In the Abstract:

line 16, "selected" should be --executed--.

Col. 1, line 60, delete "is",

Col. 2, line 14, change " " to --"*"--.

Col. 3, line 1, change "where" to --were--;

line 22, "an" should be --and--;

line 39, should be new paragraph started with "In...". Rest of same paragraph should be flush to left margin, rather than indented;

line 48, "$=n_2$" should be --$\pm n_2$--.

Col. 4, line 48, "poperable" should be --operable--.

Signed and Sealed this

Third Day of September 1985

[SEAL]

Attest:

DONALD J. QUIGG

Attesting Officer     Acting Commissioner of Patents and Trademarks - Designate